(12) United States Patent
DuHack

(10) Patent No.: US 6,460,367 B1
(45) Date of Patent: Oct. 8, 2002

(54) WATER DELIVERY SYSTEM FOR REFRIGERATOR

(75) Inventor: Michael DuHack, Indianapolis, IN (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/839,087

(22) Filed: Apr. 20, 2001

(51) Int. Cl.[7] ................................................. F25C 1/00
(52) U.S. Cl. ........................... 62/337; 62/340; 137/883; 222/144.5
(58) Field of Search .............. 62/337, 340; 137/601.13, 137/601.14, 883; 222/144.5, 146.6

(56) References Cited

U.S. PATENT DOCUMENTS

| | | |
|---|---|---|
| 3,429,140 A | 2/1969 | White |
| 3,941,153 A | 3/1976 | Traube |
| 3,982,406 A | 9/1976 | Hanson |
| 4,270,570 A | 6/1981 | Kolze |
| 4,450,863 A | 5/1984 | Brown |
| 4,571,953 A | 2/1986 | Caruso |
| 4,885,085 A | 12/1989 | Beall, Jr. |
| 5,083,442 A | 1/1992 | Vlock |
| 5,135,645 A | 8/1992 | Sklenak |
| 5,145,145 A | 9/1992 | Pick |
| 5,269,333 A | 12/1993 | Richmond |
| 5,363,873 A | 11/1994 | Richmond |
| 5,502,978 A | 4/1996 | Field |
| 5,707,518 A | 1/1998 | Coates |
| 5,715,699 A | 2/1998 | Coates |
| 5,737,932 A | 4/1998 | Lee |
| 5,813,245 A | 9/1998 | Coates |
| 5,907,958 A | 6/1999 | Coates |
| 5,956,967 A | 9/1999 | Kim |

*Primary Examiner*—William E. Tapolcai
(74) *Attorney, Agent, or Firm*—Harness, Dickey & Pierce P.L.C.

(57) ABSTRACT

A water delivery system having increased flow rate properties for use in a refrigerator is provided. The water delivery system includes a pilot operated solenoid valve which feeds water to a water filter. The filtered water flows out of the filter to a second pilot operated solenoid valve. The second pilot operated solenoid valve has a first output which delivers water to a chilled water dispenser and a second output having a direct acting valve delivers water to an icemaker.

10 Claims, 8 Drawing Sheets

US 6,460,367 B1

WATER DELIVERY SYSTEM FOR REFRIGERATOR

FIELD OF THE INVENTION

The present invention relates generally to water filters, and more particularly to a valve configuration for refrigerators having water filtration systems.

BACKGROUND

In recent years there has been an increasing desire to make water filtration systems available with household refrigerators. The integration of a water filtration system with a refrigerator mounted water dispenser and automatic ice maker has become increasingly popular. Because of this demand there has been a number of systems created to provide water filtration with water dispensing and automatic ice making capabilities within a household refrigerator.

Historically household refrigerators have been equipped with a valve configuration which included the utilization of direct acting valves. The water flow rate requirements associated with icemaker and water dispense features were relatively low (0.25 gpm to 0.5 gpm). The water source for such a system needed to provide 20 psi to meet this requirement. Since filter systems have been introduced to the refrigerator's water delivery system, these parameters have changed. A filter adds an additional pressure drop to the water delivery system that adversely affects the flow rate. The reduction in pressure results in the need to allow extended time for water dispense applications. Additionally, this causes accelerated wear on the typical coils or field windings that energize the solenoid valves. Alternatively, more costly coils must be used to withstand the extended water dispense times. To address this concern, refrigerator manufacturers request an increase in the rated minimum pressure of the system to around 35 psi.

SUMMARY OF THE INVENTION

The present invention provides an improved water filtration and dispensing system for a refrigerator. The water delivery system configuration includes the implementation of pilot valves located upstream and/or downstream of the water filter. The first control valve consists of a pilot operated valve that receives a household water supply and is fluidly connected to the water filter assembly. The filtered water flows out the filter assembly to a second control valve. The second control valve has a first output consisting of a direct acting valve fluidly connected to an ice making device and a second output consisting of a pilot operated or direct acting valve fluidly connected to a water dispensing device.

The implementation of pilot operated valves located upstream and/or downstream of the water filter provides an increased flowrate of filtered water at the water dispenser and icemaker. This configuration will enable refrigerator manufacturers to require a lower minimum pressure rating of the system than originally needed for refrigerators with water filtration systems and water dispensers. A requirement of 20 psi. allows for sufficient water supply with the pilot valve integrated system.

The increased flowrate associated with the pilot operated valves allows for a reduction of solenoid actuation time and therefore reduces the wear incurred by the coils or field windings.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
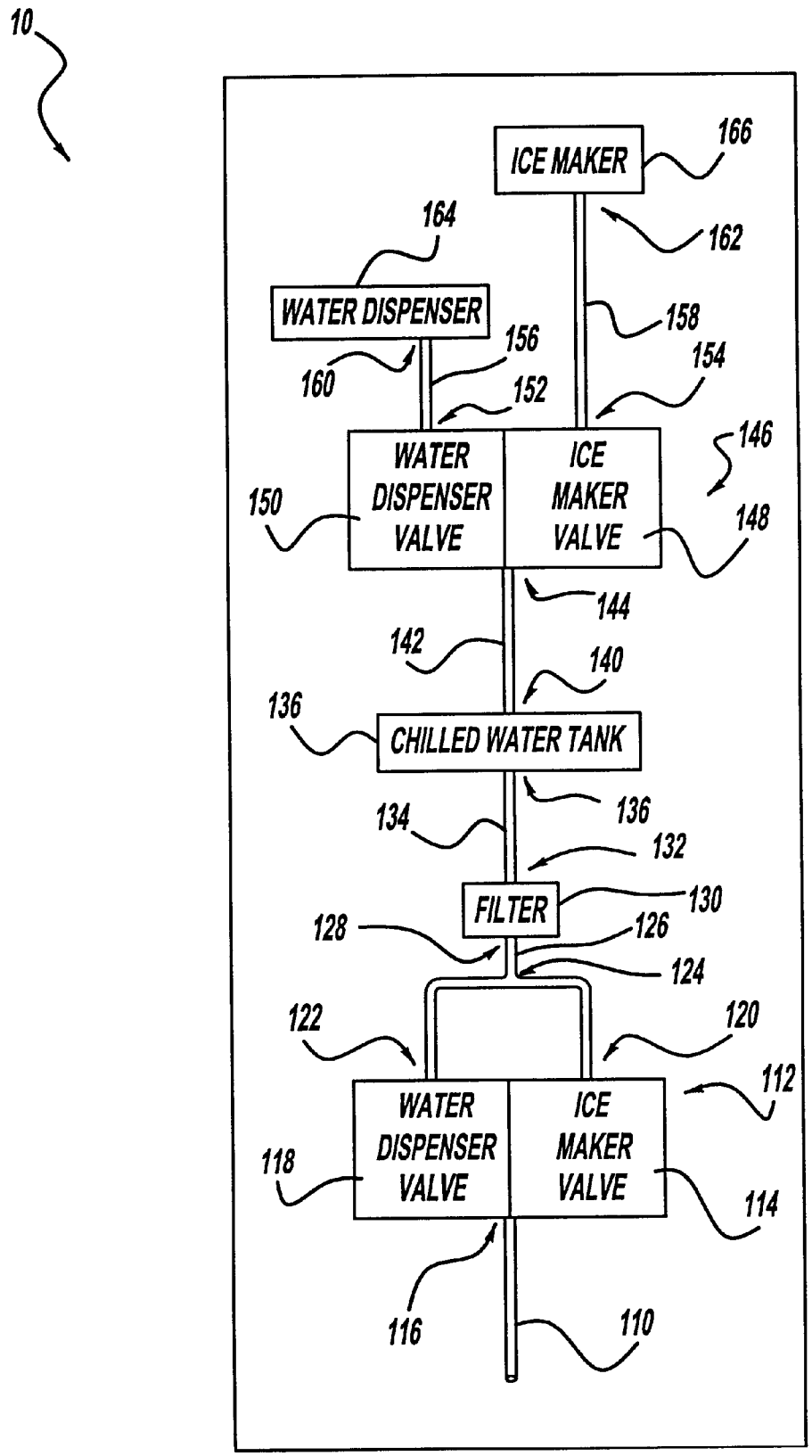
FIG. 1 is a simplified block diagram of the water delivery system configured according to a first embodiment of the present invention.

The general configuration according to the first embodiment is shown in FIG. 1. A refrigerator 10 including a first and second valve assembly 112, 146 is illustrated. First valve assembly 112 includes pilot operated valve 118 and direct acting valve 114. Second valve assembly 146 includes pilot operated valve 150 and direct acting valve 148. Water filter 130 and chilled water tank 138 are disposed between first valve assembly 112 and second valve assembly 146. The refrigerator receives household tap water through a household water line 110. Water enters first valve assembly 112 at port 116.

The actuation of pilot operated valves 118, 150 is determined by the activation of water dispenser 164. Accordingly, direct acting valves 114, 148 operate with the activation of the ice maker 166. The direct acting valves 114, 148 are used in the icemaker side of the valve assemblies 112, 146 because the flow rate requirements of the icemaker allow for a reduced input flow rate. Pilot valves 118, 150 cooperate upon activation of water dispenser 164 to allow for flow rates greater than that provided by the direct acting valves. As such, adequate flow rate of chilled water is realized at water dispenser 164.

The outputs 120 and 122 of valve assembly 112 merge at intersection 124. The water filter 130 receives water from input 128 through line 126.

Filtered water exits water filter 130 at output 132 and travels through line 134 to input 136 of holding tank 138. Holding tank 138 is used as a reservoir to chill water and is implemented to provide the water dispenser with pre-chilled water. One skilled in the art will recognize that holding tank 138 may alternatively be located upstream of water filter 130.

Chilled water exits holding tank 138 at output 140 and enters second valve assembly 146 at input 144 via line 142. Pilot operated valve 150 releases water to water dispenser 164 at input 160 through line 156. The direct acting valve 148 releases water at output 154 through line 158 to icemaker 166 at input 162.

Figure 4:
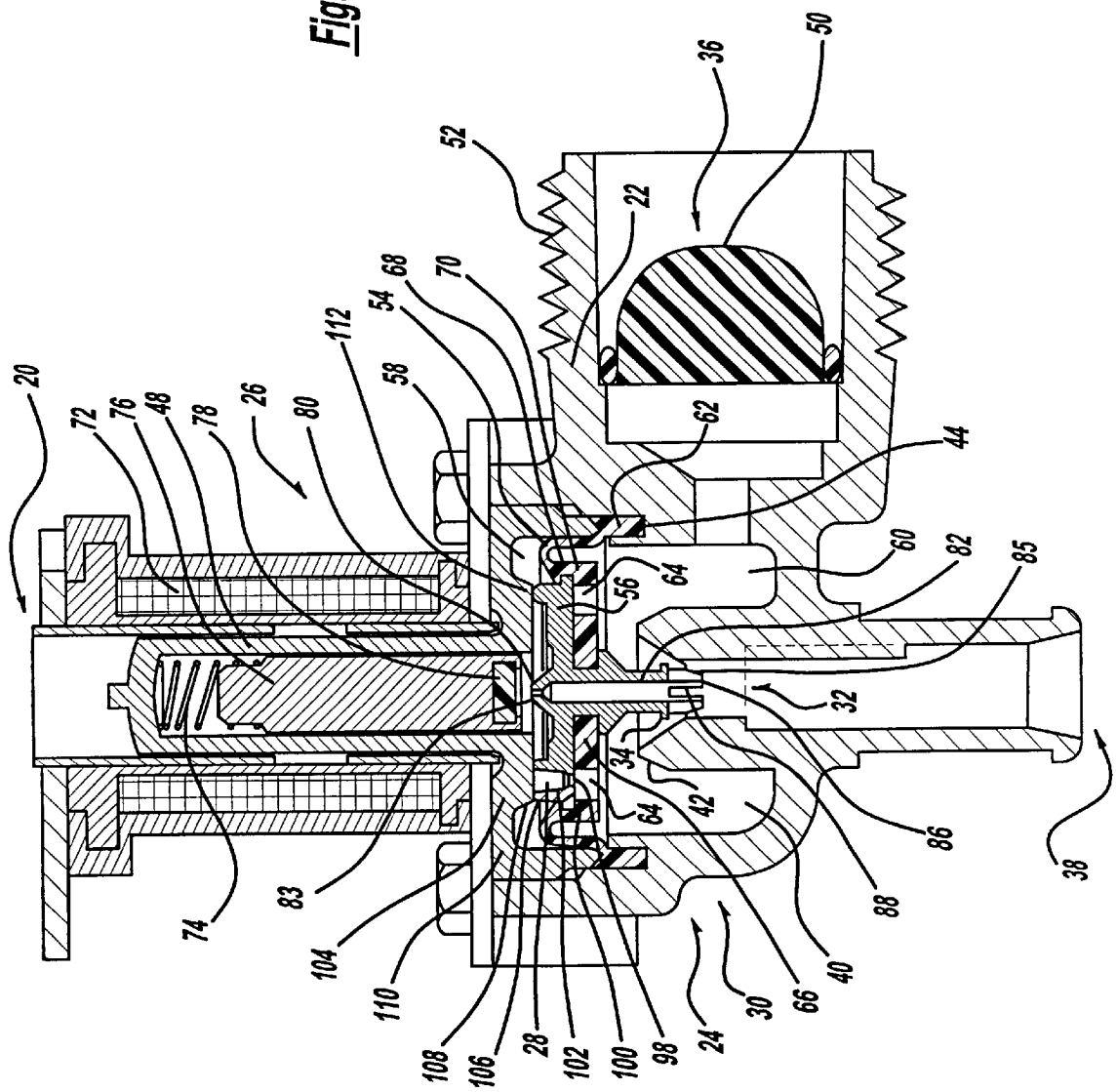
FIG. 4 is a side view shown in cross-section of a single solenoid valve suitable for use in the second embodiment of the present invention.

Referring to FIG. 4, valve 20 will be referred to describe the construction of the pilot valve in detail. A similar construction is taught in U.S. Pat. No. 5,269,333 issued on Dec. 14, 1993 to the assignee of the present invention, namely Emerson Electric Co. The configuration and description of the pilot operated valve of FIG. 4 is equivalent to the pilot operated valve used in all embodiments of the present invention. Pilot operated valve 20 comprises: a valve body 22, a main valve 24, a pilot valve 26, a bleed passage 28, a flow reduction means 30, a vacuum reduction opening 32, and an anti-hammer rib 34.

The valve body 22 is typically polypropylene and comprises an inlet 36, and outlet 38, a valving cavity 40, a valving surface 42, a diaphragm retention groove 44, and a guide tube 48 or armature housing. The inlet 36 includes an inlet screen 50 to prevent large particulate contamination from entering the water valve 20. The inlet screen 50 is typically a woven wire cloth. Mesh sizes typically range from 40 to 80 meshes/inch depending on application. A residential water line with service pressures ranging 20–125 pounds per square inch (138–861.9 kPa) is connected to the inlet 36 typically with a threaded garden hose type connector 52 or a threaded pipe connector (not shown) to create flow rates through the water valve 20 of about seven-tenths (0.7) to about ten (10) gallons (2.58–37.86 liters) per minute or higher. The outlet 38 is typically a tube connector to which an appliance fill tube (not shown) is connected.

The valve body 22 includes a valving cavity 40 disposed between and communicating with the inlet 36 and outlet 38. The valving surface 42 is contained in the valving cavity 40 adjacent to the outlet 38. The valving cavity 40 also contains a retention groove 44 for fixing the main valve 24 (pilot operator). The guide tube 48 is designed to cooperate with the retention groove 44 for fixing the main valve 24 in position.

The main valve 24 comprises a diaphragm 54 and a diaphragm insert 56. The main valve 24 divides the valving cavity 40 into an actuation chamber 58 and a main chamber 60. The main valve 24 is moveable to an open position away from the valving surface 42 for permitting water flow from the inlet 36 through the valving cavity 40 to the outlet 38, and moveable to a closed position contacting the valving surface 42 for preventing water flow from the inlet 36 through the valving cavity 40. The diaphragm 54 is flexible and is typically made of ethylene propylene (EP) rubber and includes a retention ridge 62, diaphragm bleed orifice 64, and a diaphragm valve seat 66. The retention ridge 62 fits in a diaphragm retention groove 44 in the valve body 22 and the guide tube 48 sets on the retention ridge 62 to fix the diaphragm 54 in the valve body 22 and to create a seal.

The diaphragm insert 56 comprises retention tabs 68, and carries the pilot valve 26 and bleed passage 28. The main valve 24 diaphragm insert 56 is rigid and is typically made of polypropylene. The diaphragm insert 56 retention tabs 68 fit within a diaphragm groove 70 to fix the diaphragm insert 56 in the diaphragm 54.

The pilot valve 26 includes field windings 72, a biasing spring 74, a solenoid armature 76, a pilot valve seat 78, a pilot valve surface 80, a pilot valve outlet extension 82, and a pilot valve passage 83. The pilot valve seat 78 is attached to the armature 76. The armature 76 is slideably carried in the guide tube 48 and is moveable to an open position away from the pilot valve surface 80 for permitting water flow from the actuation chamber 58 to the outlet 38 and moveable to a closed position contacting the pilot valve surface 80 for preventing water flow from the actuation chamber 58 to the outlet 38. The pilot valve passage 83 is approximately 0.033 inches (0.084 cm) which is larger than the bleed passage 28. The pilot valve outlet extension 82 slideably engages the outlet 38 for providing a water flow channel from the actuation chamber 58 through the pilot valve passage 83 into the outlet 38.

When the field windings 72 are energized, the armature 76 is retracted to lift the pilot valve seal 78 from the pilot valve surface 80 thereby opening the pilot valve 26 to permit flow of water from the actuation chamber 58 into the outlet 38. When the field windings 72 are deenergized, the armature 76 is extended by the biasing spring 74 and the pilot valve seat 78 contacts the pilot valve surface 80 thereby closing the pilot valve 26 to stop the flow of water from the actuation chamber 58 through the pilot valve 26 and into the outlet 38. The pilot valve outlet extension 82 extends through the diaphragm 54 into the outlet 38.

The pilot valve outlet extension 82 includes an anti-hammer rib 34 on the exterior of the pilot valve outlet extension 82 which functions to slow main valve 24 closing and thereby reduce internal valve noise and pipe hammer cause by a pressure spike generated when a main valve 24 closes too quickly. The anti-hammer rib 34 may also be called an annular rib, ridge, lip, band, or bead. The anti-hammer rib 34 slows main valve 24 closing by restricting the outlet 38 when the anti-hammer rib 34 enters the outlet 38. The anti-hammer rib 34 also slows valve 24 closing by creating turbulence in the water flow into the outlet 38 and by creating a back pressure when engaging the outlet 38. The anti-hammer rib's 34 slowing of main valve 24 closing reduces internal water valve 20 noise and pipe hammer. The anti-hammer rib 34 is a continuous or interrupted rib and is separated from the downstream end 86 of the pilot valve outlet extension 82 by a guide tip 85. The guide tip 85 has a downstream end 86 that is tapered to guide the pilot valve outlet extension 82 into the outlet 38 when the main valve 24 moves from an opened position to a closed position.

The anti-hammer rib 34 is adjacent to a vacuum reduction opening 88 that extends from the anti-hammer rib 34 to the downstream end 86 of the pilot valve outlet extension 82. Although the anti-hammer rib 34 can vary in width, the anti-hammer rib 34 is preferably no wider than about 0.025 inches (0.0635 centimeters) to reduce the likelihood that contamination can come between the anti-hammer rib 34 and the outlet 38 to interfere with water valve 20 operation. A portion of the anti-hammer rib 34 downstream edge 90 is chamfered to about a 30 degree angle for ease of downstream movement in the outlet 38, and to increase structural strength.

Figure 8:
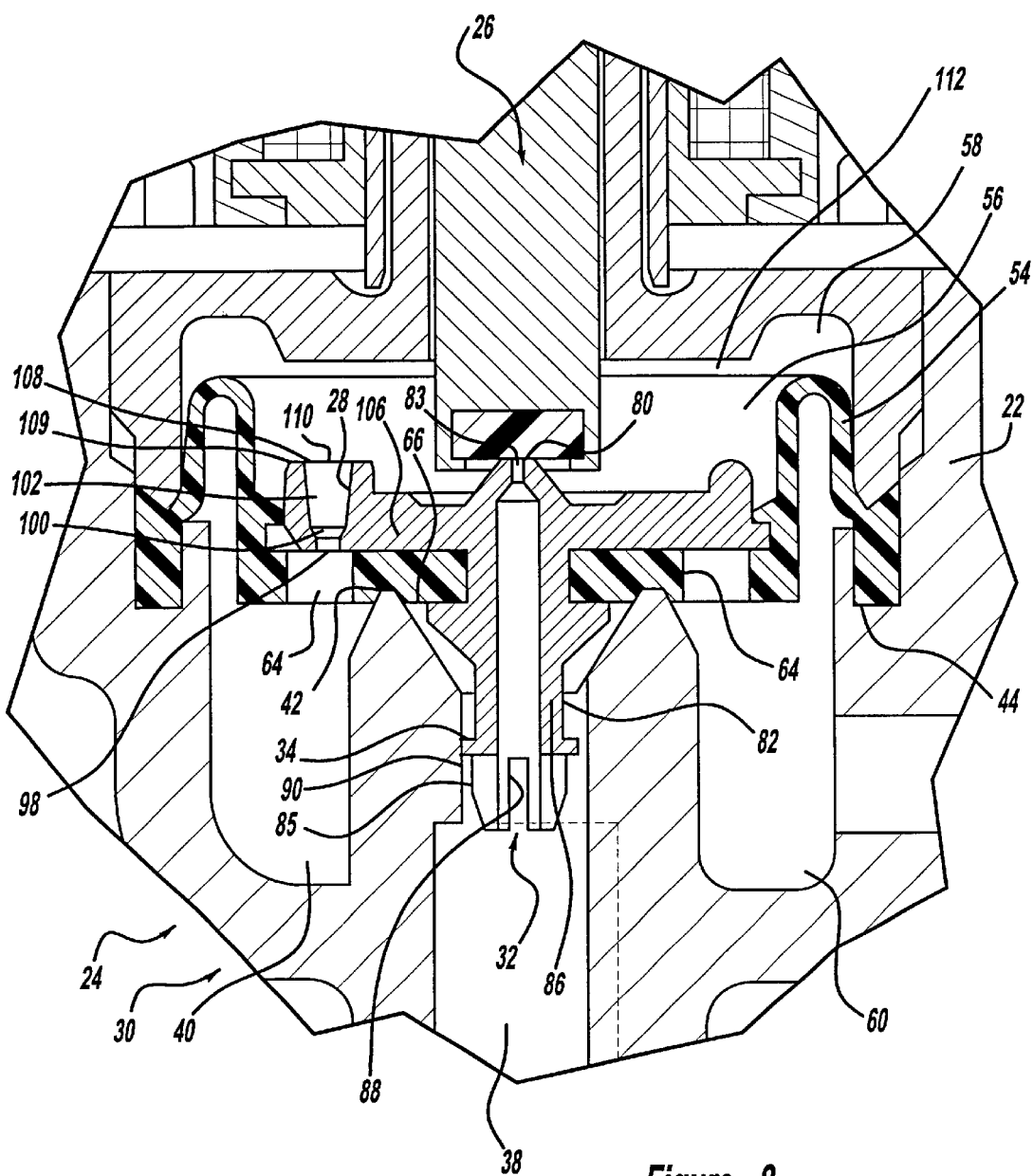
FIG. 8 illustrates the diaphragm insert in the closed position with the pilot valve also closed.

The bleed passage 28 comprises a main chamber opening 98, a sharply widening bore 100, and a gradually widening bore 102. The function of the bleed passage 28 is to alternately provide a pressure drop or equalize pressure between the actuation chamber 58 and the main chamber 60. The main chamber opening 98 is about 0.029 inches (0.074 cm) in diameter which is smaller than the pilot valve passage 83 and at least 0.005 of an inch (0.0127 cm) thick to permit ease of manufacturing and to reduce the potential for the main chamber opening 98 to be eroded. The main chamber opening 98 can extend through the diaphragm bleed orifice 64 (FIG. 8). Since the main chamber opening 98 opens directly into the main chamber 60, contamination between the main chamber opening 98 and the diaphragm bleed orifice 64 is eliminated (FIG. 8). The sharply widening bore 100 of the bleed passage 28 begins immediately after the main chamber opening 98 and extends to the gradually widening bore 102 of the bleed passage 28. The sharply widening bore 100 functions to decrease the potential for contaminates to interfere or lodge in the main chamber opening 98. The gradually widening bore 102 functions to decrease the potential that contaminates will interfere or lodge in the gradually widening bore 102.

The flow reduction means 30 comprises a bleed valve 106 and a vacuum reduction opening 88. The flow reduction means 30 reduces water flow with accompanying contaminates into the bleed passage 28 when the main valve 24 is open thus reducing the potential for contaminates to deposit in the water valve 20. The bleed valve 106 has a seat 108 for mating with the guide tube 48 when the main valve 24 is open to substantially close the bleed valve 106. The bleed valve 106 is substantially closed when water flow is reduced through the bleed passage 28, yet enough water flow is permitted so when the pilot valve 26 initially closes enough water can flow through the bleed passage 28 to move the main valve 24 toward the outlet 38 to open the bleed valve 106.

Both the bleed valve seat 108 and the guide tube 48 are plastic, so when the bleed valve seat 108 mates with the guide tube 48 an imperfect seal is formed to permit a minimum flow of water. The water valve 20 requires a minimum flow of water so the instant the pilot valve 26 closes there will be enough water flow into the actuation chamber 58 to increase pressure enough to move the main valve 24 to open the bleed valve 106 to permit water flow through the bleed valve 106.

The vacuum reduction means 32 comprises four vacuum reduction openings 88 in the pilot valve outlet extension 82. The vacuum reduction openings 88 could be configured in a variety of ways and achieve a similar result such as: by boring holes or horizontal slots. The four vacuum reduction openings 88 begin at the downstream opening 86 of the pilot valve outlet extension 82 and extend up to the anti-hammer rib 34. The purpose of the vacuum reduction means 32 is to decrease the effectiveness of the pilot valve extension's 82 venturi when the main valve 24 is open, thus reducing vacuum drawn from the outlet 38 into the actuation chamber 58 through the pilot valve outlet extension 82. If less vacuum is drawn into the actuation chamber 58 when the main valve 24 is open, then the pressure differential between the main chamber 60 and the actuation chamber 58 is decreased and therefore water flow, with accompanying contaminates, through the bleed passage 28 into the actuation chamber 58 is reduced.

When the pilot valve 26 is open, the armature field windings 72 are energized, so the armature biasing spring 74 is compressed, and the armature 76 is pulled away from the pilot valve opening 83. With the pilot valve 26 opened, pressure in the actuation chamber 58 is lower than pressure in the main chamber 60 because a partial vacuum generated by water flow into the outlet 38 is transmitting into the actuation chamber 58 via the pilot valve outlet extension 82.

Figure 6:
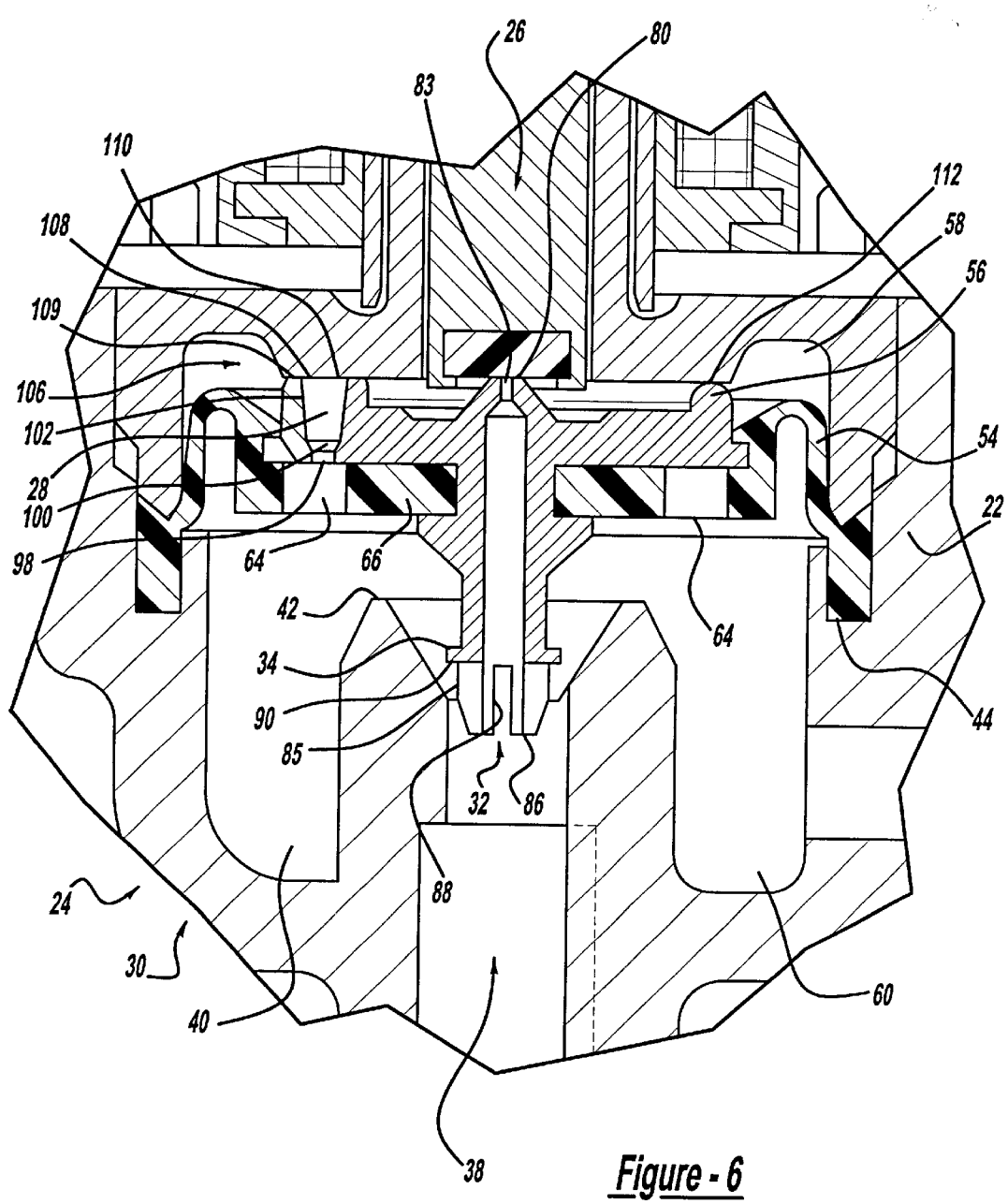
FIG. 6 illustrates the diaphragm insert in the open position with the pilot valve closed.

FIG. 6 shows the main valve 24 fully open and the pilot valve 26 has just closed and the bleed valve 106 continues to be substantially closed. Since the pilot valve 26 has just closed, the main valve 24 will begin moving from an open position to a closed position. The pilot valve 26 closed when the armature field windings 72 were deenergized and the biasing spring 74 extended the armature 76 causing the pilot valve seat 78 to contact the pilot valve valving surface 80.

Since the pilot valve 26 is closed, water that passes through the substantially closed bleed valve 106 cannot exit the actuation chamber 58, and vacuum is no longer drawn through the pilot valve outlet extension 82 from the outlet 38. Pressure in the actuation chamber 58 quickly equals pressure in the main chamber 60 causing the main valve 24 to move toward the lower pressure outlet 38 to close the main valve 24. As the main valve 24 moves toward the valving surface 42, the bleed valve 106 is fully opened permitting free flow of water through the bleed passage 28.

Figure 7:
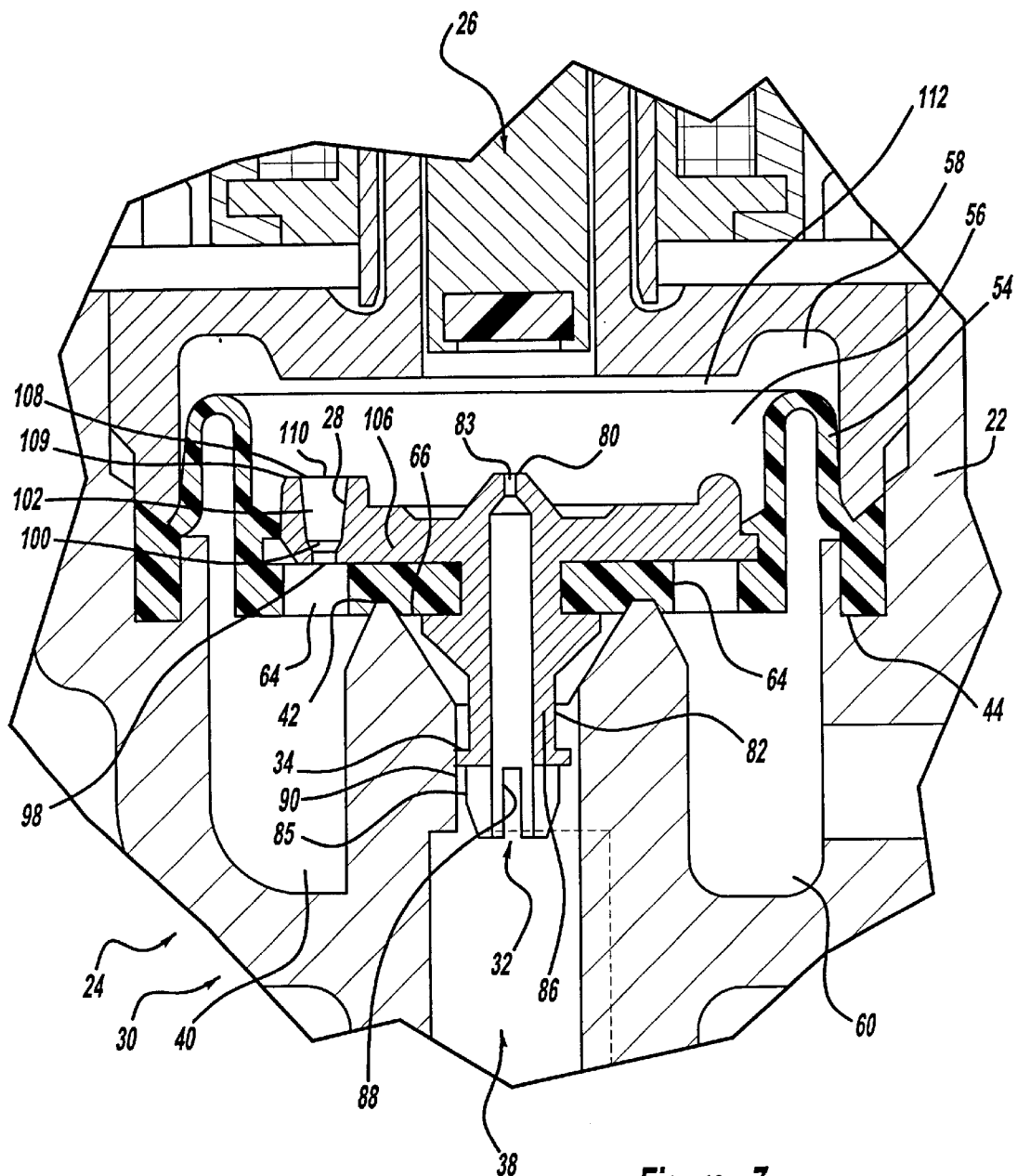
FIG. 7 illustrates the diaphragm insert in the closed position with the pilot valve opened.

FIG. 7 continues to show the main valve 24 in the closed position but with the pilot valve 26 opened. Since the bleed valve 106 is open, water can flow freely through the bleed passage 28, into the actuation chamber 58, through the pilot valve 26 and into the outlet 38. Armature field windings 72 are energizing to retract the armature 76 and open the pilot valve 26. Once the pilot valve 26 is opened, water flows freely from the actuation chamber 58 through the pilot valve 26 and into the outlet 38. Replacement water flows into the actuation chamber 58 through the bleed passage 28 which has a smaller bleed passage main chamber opening 98 than the pilot valve passage 83. This difference in opening size causes pressure to be lower in the actuation chamber 58, and the lower pressure causes the main valve 24 to move to the open position.

FIG. 8 shows the main valve 24 in the closed position with the main valve seat 66 contacting the valving surface 42 to prevent water flow from the main chamber 60 into the outlet 38, and the pilot valve 26 is also closed. Since the water pressure causes the main chamber 60 to be at a higher pressure than the outlet 38, the pressure differential between the main chamber 60 and outlet 38 maintains the main valve 24 in the closed position. Although the bleed valve 106 is open, since the pilot valve 26 is closed little or no water flows through the bleed passage 28.

Armature field windings 72 continue to be deenergized so the biasing spring 74 continues to extend the armature 76 to close the pilot valve 26. The anti-hammer rib 34 is fitted into the outlet 38. As the main valve 24 moves from the open to the closed position, the anti-hammer rib 34 dampens main valve 24 closing by temporarily decreasing the pressure differential between the main chamber 60 and the outlet 38 when the anti-hammer rib 34 engages the outlet 38.

Figure 3:
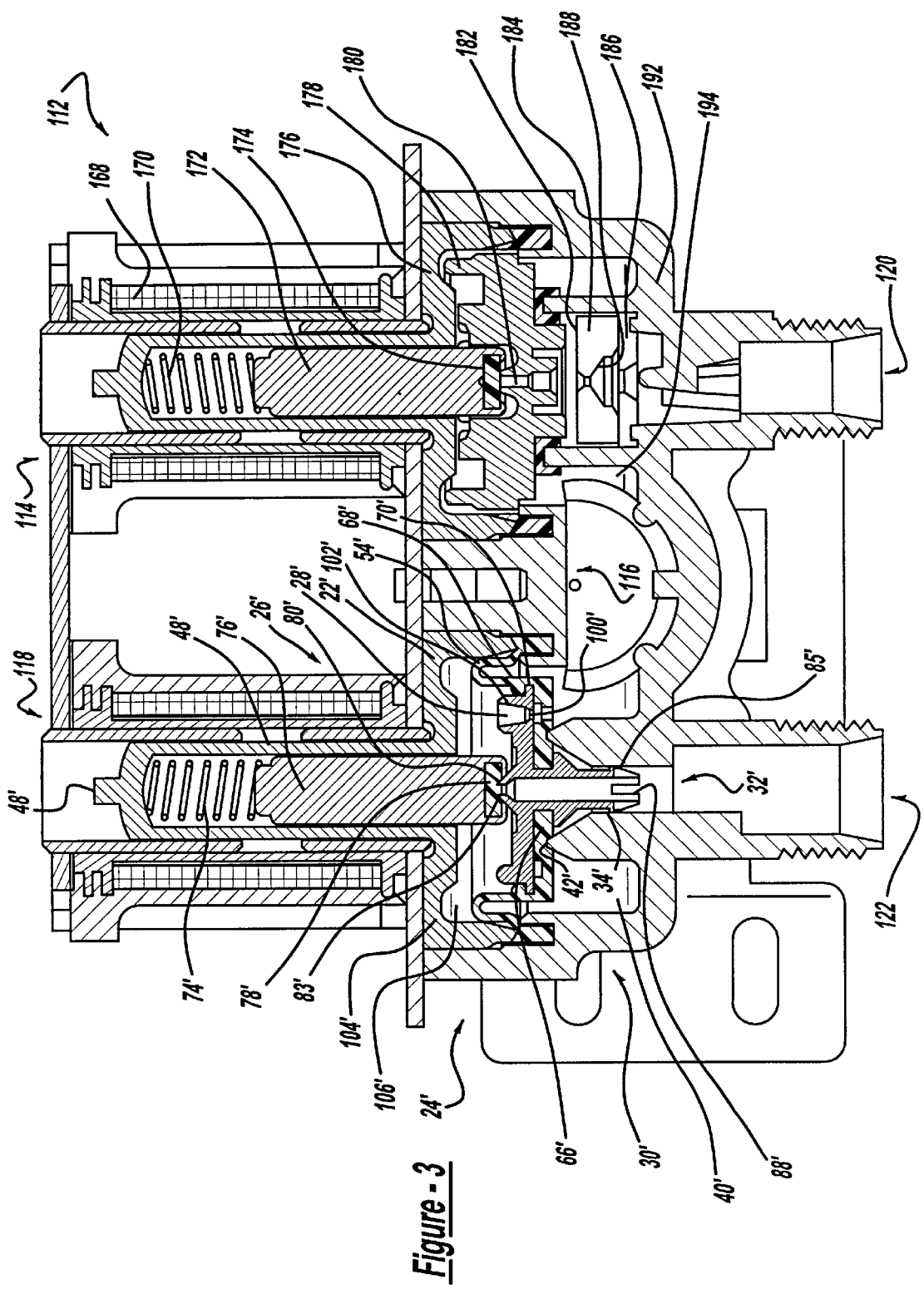
FIG. 3 is a front view shown in cross-section of a dual solenoid valve suitable for use in the first embodiment of the present invention.
Figure 5:
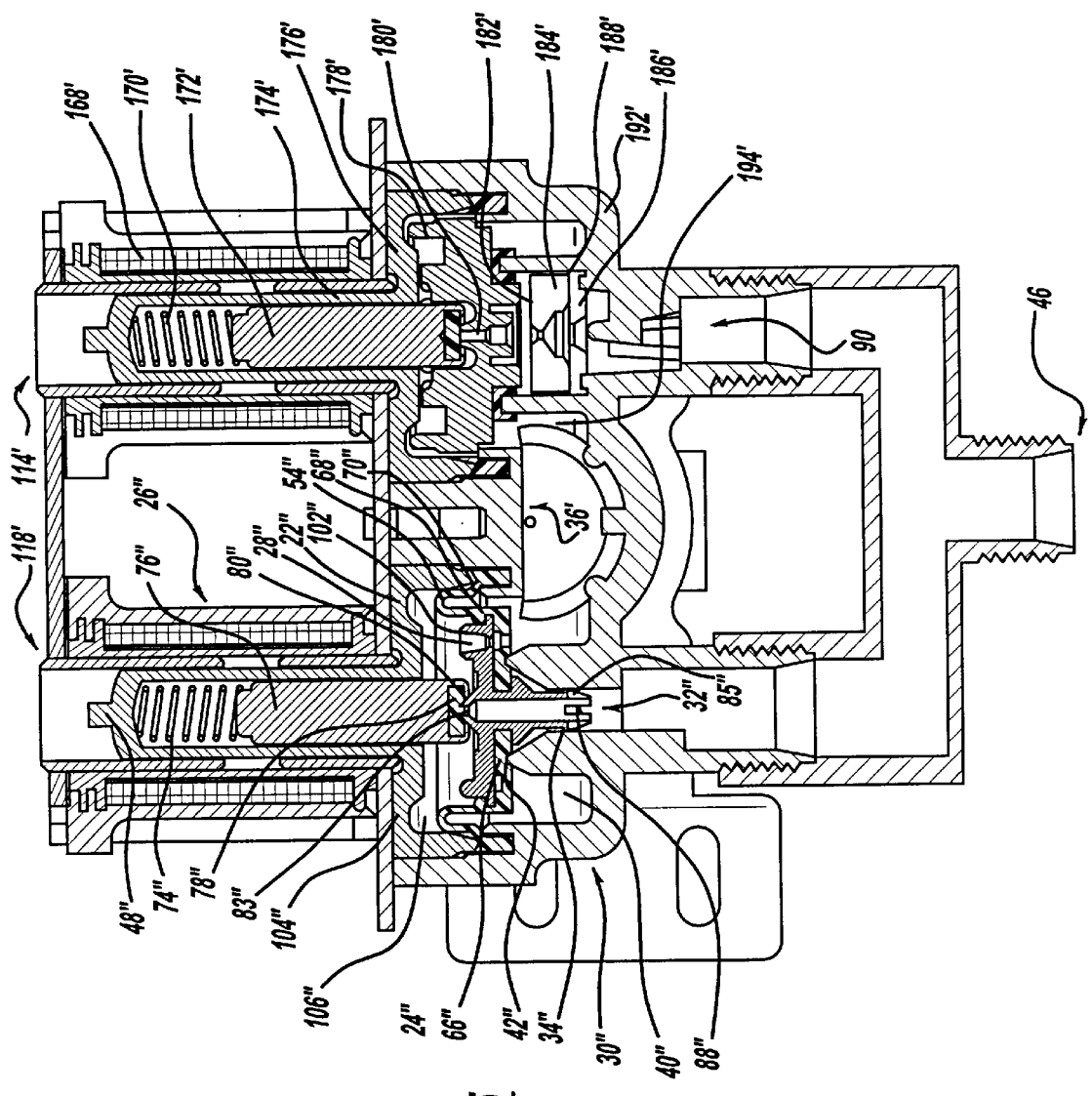
FIG. 5 is a front view shown in cross-section of a dual solenoid valve suitable for use in the third embodiment of the present invention.

With reference to FIGS. 3 and 5, the direct acting valve 114 will now be described. A similar construction is taught in U.S. Pat. No. 6,076,801 issued on Jun. 20, 2000 to the assignee of the present invention, namely Emerson Electric Co the disclosure which is hereby incorporated by reference. Direct acting valve 114 includes a solenoid coil 168, an armature 172, a spring 170 and a guide tube 176. The armature 172 and spring 170 are disposed in the guide tube 176 with the spring 170 acting upon the armature 172 to bias the armature 172 towards a valve seat 178 thereby blocking a valve seat orifice 180 and preventing the flow of water through the valve body 192. When the solenoid coil 168 is electrically energized, a magnetic field is created which lifts the armature 172 into an open position where the armature 172 is spaced apart from the valve seat 178 and thereby allows the flow of water to advance through the valve body 192. Thereafter, the flow of water advances through the valving cavity, passes through the valve seat orifice 180 and exits out the valve body 192 through the outlet 120. The armature 172 includes an armature tip 174 which contacts the valve seat 178 and blocks the valve seat orifice 180.

Direct acting valve 114 further includes a flow control member 184 and a flow control washer 186. The flow control member 184, which is disposed between the valve seat 178 and the flow control washer 186, is made of a flexible material such as ethylene propylene (EP) rubber, and has a central passage 188 defined therein. The flow control member 184 flexes or deforms in response to variations in inlet water pressure on the surface 182 thereof. In particular, a higher inlet water pressure on surface 182 causes a greater amount of flexing or deformity of the flow control member 184, thereby reducing the diameter of the central passage 188. A lower inlet water pressure exerted on the upstream surface 182 causes the flexing or deformity of the flow control to be reduced, thereby increasing the diameter of the central passage 188.

For reference, like components of pilot valve 118 in FIG. 3 and pilot valve 118' in FIG. 5 have been identified with like reference numerals from pilot valve 20 in FIG. 4. Accordingly, like components of direct acting valve 114' of FIG. 5 have been identified with like reference numerals from direct acting valve 114 of FIG. 3.

Referring to FIG. 1, according to the teachings of this invention and the configuration of the preferred embodiment, a user upon requesting water from the water dispenser triggers actuation of first and second pilot operated valves 118 and 150. Explained further, pilot valve 118 of valve assembly 112 receives water from line 110 and delivers it through line 124 to water filter 130. Pilot valve 150 of valve assembly 146 receives chilled water from chilled water tank 138 through line 142 and delivers it through line 156 to the user at water dispenser 164. Concurrently, filtered water leaves filter 130 through line 134 to refill the water removed from chilled water tank 138.

The direct acting valves 114 and 148 are actuated when the supply of ice has diminished to a predetermined level. Direct acting valve 114 of valve assembly 112 receives water from line 110 and delivers it through line 124 to water filter 130. Direct acting valve 148 of valve assembly 146 receives water from chilled water tank 138 through line 142 and delivers it to ice maker 166 through line 158. Concurrently, filtered water leaves filter 130 through line 134 to refill the water removed from chilled water tank 138.

Figure 2:
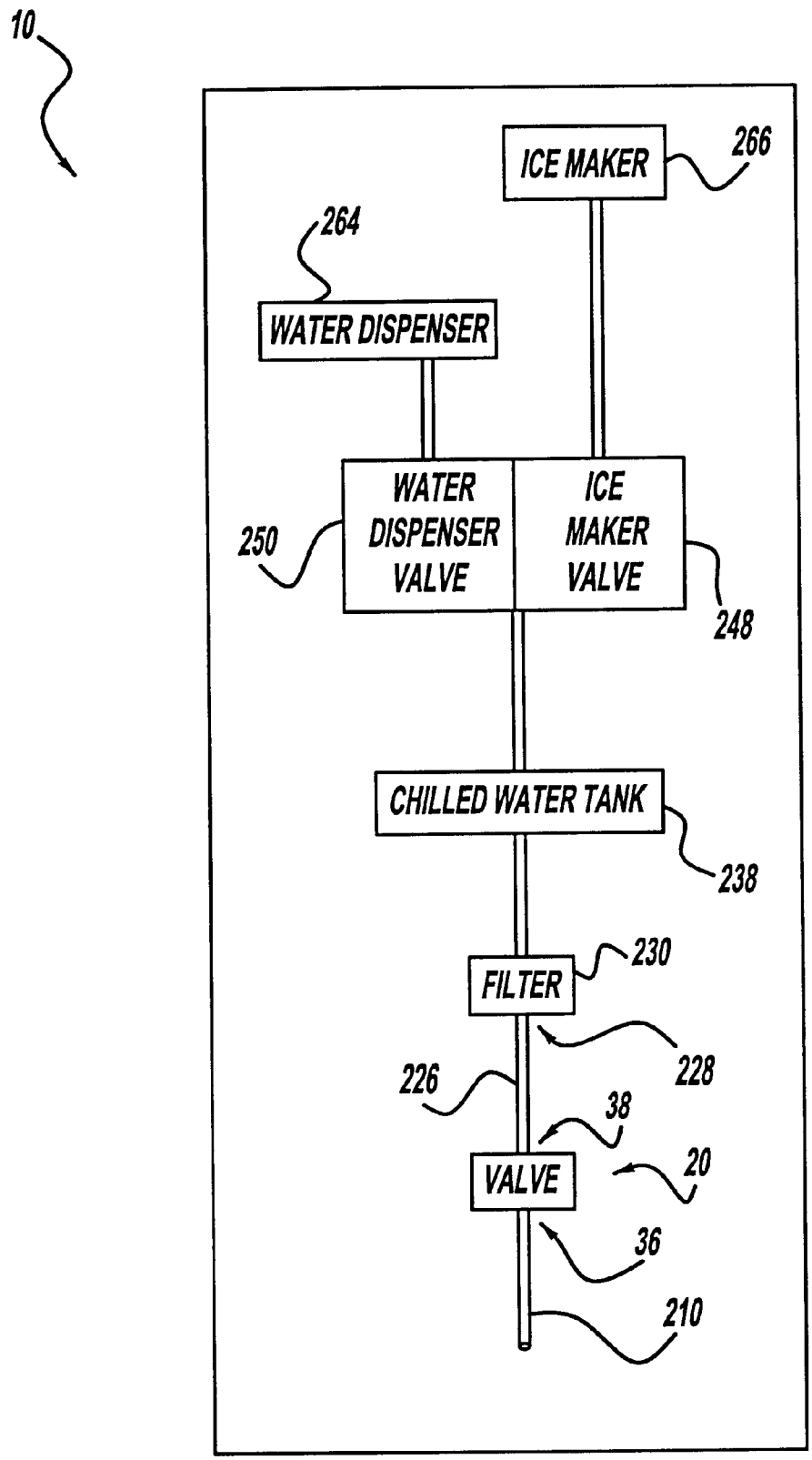
FIG. 2 is a simplified block diagram of the water delivery system configured according to a second and third embodiment of the present invention.

Referring now to FIG. 2, the valve arrangement according to a second embodiment is illustrated. The first valve assembly includes a single solenoid pilot operating valve 20. The remaining configuration remains identical to the preferred embodiment. The activation of water dispenser 264 or the activation of ice maker 266 initiates the actuation of pilot operated valve assembly 20. When pilot valve 20 is energized, water enters through input 36 and is released at output 38 through line 226 to input 228 of filter 230. The water then flows to the chilled water tank 238 and to the pilot actuated valve 250 and water dispenser 264 or direct acting valve 248 and ice maker 266 according to the requesting component.

A third embodiment includes the implementation of a dual solenoid valve having a single output. The dual solenoid valve with single output (see FIG. 5) may be viewed as valve 20 as shown in FIG. 2. The components and operation are equivalent to those used in the first embodiment (see FIG. 3) except the two distinct outputs are merged inside the valve housing and lead to a single outlet 46.

A fourth embodiment has an equivalent arrangement as described in the first embodiment with the exception of the first valve assembly which includes two pilot operated valves. Shown in FIG. 1, first valve assembly 112 includes pilot operated valves 118 and 114.

A fifth embodiment has the same configuration as the fourth embodiment, except the second valve assembly includes two direct acting valves. Explained further, shown in FIG. 1, second valve assembly 146 includes direct acting valves 148 and 150.

The invention being thus described, it can be readily appreciated that the same may be varied in many ways. Such variations are not to be regarded as a departure from the spirit and scope of the invention, and all such modifications as would be within the contemplation of one skilled in the art are intended to be included within the scope of the following claims.

What is claimed is:

1. A water delivery and filtration system for a refrigerator comprising:

a first valve assembly including an inlet, a first pilot operated valve having an outlet and a first direct acting valve having an outlet;

a second valve assembly including an inlet, a second pilot operated valve having an outlet and a second direct acting valve having an outlet;

a water filter having an inlet and an outlet, said water filter disposed downstream of said first valve assembly and upstream of said second valve assembly;

a water dispenser fluidly connected to said outlet of said second pilot operated valve;

an ice maker fluidly connected to said outlet of said second direct acting valve; and a household water line fluidly connected to said inlet of said first valve assembly.

2. The water delivery and filtration system according to claim 1, further comprising a chilled water tank disposed downstream of said first valve assembly and upstream of said second valve assembly.

3. A water delivery and filtration system for a refrigerator comprising:

a first valve assembly including an inlet, and a first pilot operated valve having an outlet;

a second valve assembly including an inlet, a second pilot operated valve having an outlet and a direct acting valve having an outlet;

a water filter having an inlet and an outlet, said water filter disposed downstream of said first valve assembly and upstream of said second valve assembly;

a water dispenser fluidly connected to said outlet of said second pilot operated valve;

an ice maker fluidly connected to said outlet of said direct acting valve; and a household water line fluidly connected to said inlet of said first valve assembly.

4. The water delivery and filtration system according to claim 3, further comprising a chilled water tank disposed downstream of said first valve assembly and upstream of said second valve assembly.

5. A water delivery and filtration system for a refrigerator comprising:

a fist valve assembly including an inlet, a first pilot operated valve, a first direct acting valve and an outlet;

a second valve assembly including an inlet, a second pilot operated valve having an outlet and a second direct acting valve having an outlet;

a water filter having an inlet and an outlet, said water filter disposed downstream of said first valve assembly and upstream of said second valve assembly;

a water dispenser fluidly connected to said outlet of said second pilot operated valve;

an ice maker fluidly connected to said outlet of said second direct acting valve; and a household water line fluidly connected to said inlet of said first valve assembly.

6. The water delivery and filtration system according to claim 5, further comprising a chilled water tank disposed downstream of said first valve assembly and upstream of said second valve assembly.

7. A water delivery and filtration system for a refrigerator comprising:

a first valve assembly including an inlet, a first pilot operated valve having an outlet and a second pilot operated valve having an outlet;

a second valve assembly including an inlet, a third pilot operated valve having an outlet and a direct acting valve having an outlet;

a water filter having an inlet and an outlet, said water filter disposed downstream of said first valve assembly and upstream of said second valve assembly;

a water dispenser fluidly connected to said outlet of said third pilot operated valve;

an ice maker fluidly connected to said outlet of said direct acting valve; and a household water line fluidly connected to said inlet of said first valve assembly.

8. The water delivery and filtration system according to claim 7, further comprising a chilled water tank disposed downstream of said first valve assembly and upstream of said second valve assembly.

9. A water delivery and filtration system for a refrigerator comprising:

a first valve assembly including an inlet, a first pilot operated valve having an outlet and a second pilot operated valve having an outlet;

a second valve assembly including an inlet, a first direct acting valve having an outlet and a second direct acting valve having an outlet;

a water filter having an inlet and an outlet, said water filter disposed downstream of said first valve assembly and upstream of said second valve assembly;

a water dispenser fluidly connected to said outlet of said first direct acting valve;

an ice maker fluidly connected to said outlet of said second direct acting valve; and a household water line fluidly connected to said inlet of said first valve assembly.

10. The water delivery and filtration system according to claim 9, further comprising a chilled water tank disposed downstream of said first valve assembly and upstream of said second valve assembly.

* * * * *

UNITED STATES PATENT AND TRADEMARK OFFICE
CERTIFICATE OF CORRECTION

PATENT NO. : 6,460,367 B1  Page 1 of 1
DATED : October 8, 2002
INVENTOR(S) : Michael DuHack It is certified that error appears in the above-identified patent and that said Letters Patent is hereby corrected as shown below:

Column 8,
Line 63, "fist" should be -- first --.

Signed and Sealed this

Eighth Day of April, 2003

JAMES E. ROGAN
*Director of the United States Patent and Trademark Office*